Sept. 14, 1943.    E. J. HEFELE    2,329,200
REMOTE CONTROL SECTIONALIZED ANTENNA
Filed Aug. 21, 1941    5 Sheets-Sheet 1

INVENTOR.
Edward J. Hefele
BY Samuel Ostrolenk
ATTORNEY

Sept. 14, 1943. E. J. HEFELE 2,329,200
REMOTE CONTROL SECTIONALIZED ANTENNA
Filed Aug. 21, 1941 5 Sheets-Sheet 2
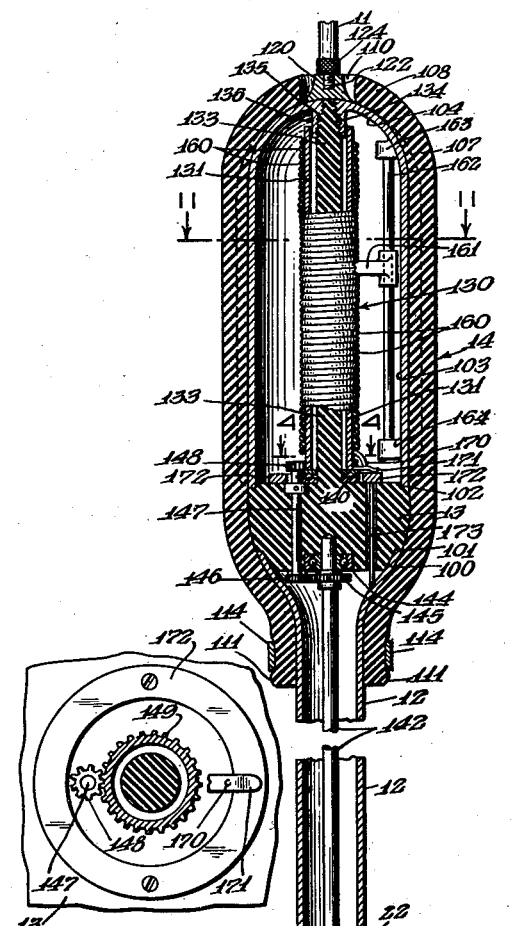
FIG.3
FIG.4.
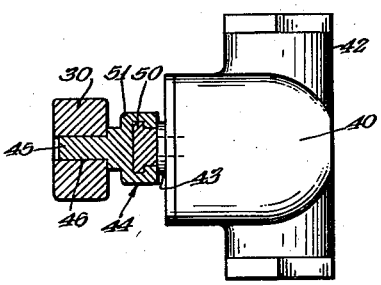
FIG.7.
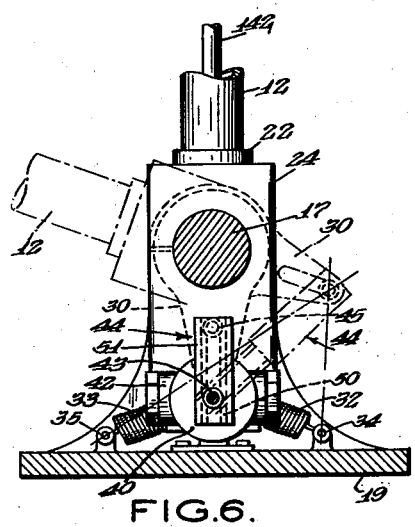
FIG.6.
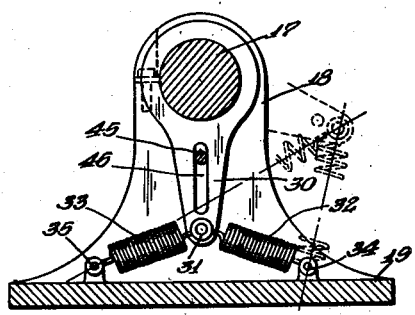
FIG.5.
INVENTOR.
Edward J. Hefele
BY
ATTORNEY Sept. 14, 1943.  E. J. HEFELE  2,329,200

REMOTE CONTROL SECTIONALIZED ANTENNA

Filed Aug. 21, 1941  5 Sheets-Sheet 3

INVENTOR.
Edward J. Hefele
BY
ATTORNEY

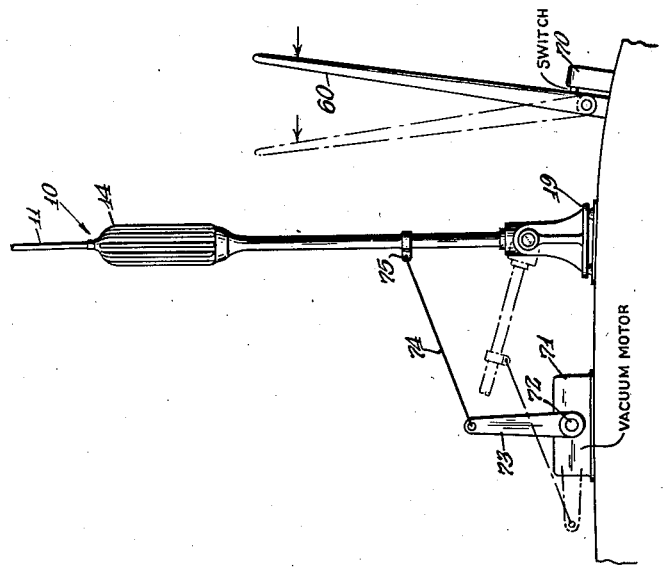
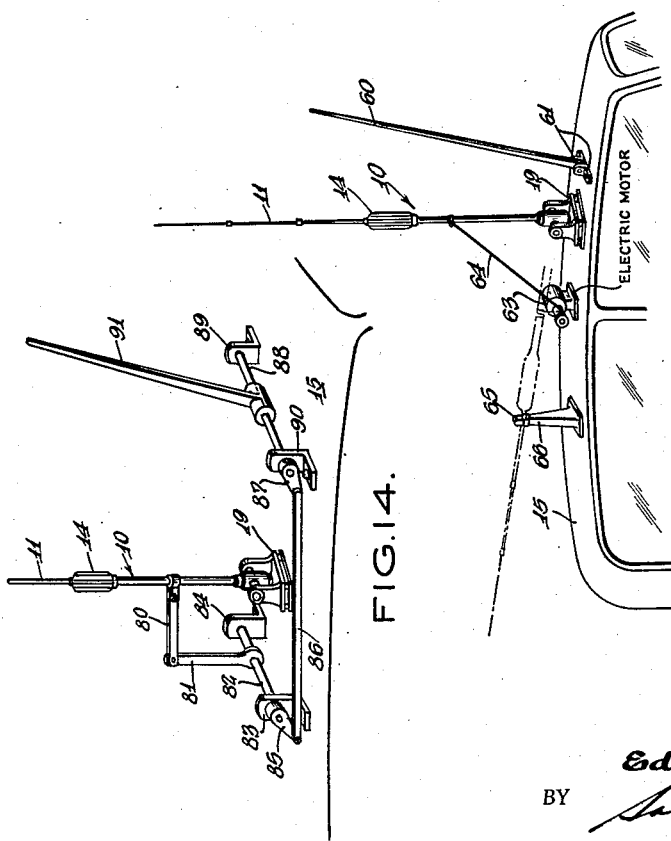

Sept. 14, 1943.  E. J. HEFELE  2,329,200
REMOTE CONTROL SECTIONALIZED ANTENNA
Filed Aug. 21, 1941   5 Sheets-Sheet 5

INVENTOR.
Edward J. Hefele
BY
ATTORNEY

Patented Sept. 14, 1943

2,329,200

UNITED STATES PATENT OFFICE 2,329,200

REMOTE CONTROL SECTIONALIZED ANTENNA

Edward J. Hefele, New York, N. Y., assignor to Jefferson-Travis Radio Manufacturing Corporation, New York, N. Y., a corporation of New York Application August 21, 1941, Serial No. 407,740

37 Claims. (Cl. 250—33)

My invention relates in general to the field of radio transmission and more particularly to a novel and improved form of sectionalized antenna having remotely adjustable impedance and transmission characteristics.

In the transmission of radio frequency energy by a vertical antenna, the vertical directivity thereof and various other transmission characteristics are directly dependent upon the length of the antenna and the effective height of the antenna.

These constants of a vertical radiator are generally fixed if a straight rod antenna is employed.

Heretofore, various means have been devised for varying these characteristics to improve the transmission efficiency of a radio transmitter.

For a conventional vertical antenna, the current distribution varies from a maximum at the lowest point thereof to zero at the uppermost point thereof in a substantially linear manner. This current distribution characteristic is effective in determining the amount of radio frequency energy radiated from this antenna. Inasmuch as the current through the upper portion of the antenna, capable of maximum radiation, is comparatively low, the over-all transmission efficiency is correspondingly small.

In one form of improved antenna design, the vertical radiator is divided at substantially the midpoint by an insulating member thus separating the upper and lower metallic sections thereof.

An impedance usually in the form of a coil of wire is electrically connected between these two sections of the antenna and hence a continuous vertical radiator is formed. This type of antenna, known as a sectionalized or loaded antenna has the characteristic that, at a particular frequency which is determined by the antenna capacitance constants and the impedance of the aforementioned coil, a more uniform current distribution occurs over the antenna. This results in a comparatively high current flow in the upper section of the antenna as compared to the prior vertical antennas which were not loaded. This increase in current in the higher section of the antenna accordingly improves the transmission efficiency thereof.

In short, the insertion of inductance to electrically connect the two sections of a vertical radiator increases the effective height of the radiator without a corresponding increase in the physical height of the antenna structure.

Heretofore, sectionalized antennæ were designed to meet a particular installation and thus the sectionalizing coils were of a fixed impedance. As a result, the transmitting antenna would be operative as a sectionalized improved radiator for a single frequency. At any particular frequency, the impedance of a sectionalized coil is predetermined so that the antenna is resonant at that frequency.

In many circumstances, it is desirable to adjust the impedance of the sectionalized coil for resonance at each of a plurality of different frequencies as well as to make adjustments for improving the radiating characteristics for any one frequency.

My invention contemplates a sectionalized vertical antenna in which the loading impedance has adjustable characteristics, so that optimum transmission efficiency may be obtained from any frequency utilized at the transmitter. In addition, my vertical sectionalized antenna is adaptable to transmission circuits where any one of a plurality of fixed frequencies may be utilized for the transmission of a signal. Accordingly, my sectionalized antenna utilizes an impedance such as a variable condenser or an inductance coil in which the number of turns inserted between the sectionalized lengths of the antenna is variable by simple automatic and manual means. Although particularly adaptable for mobile installations, it may be employed wherever adjustments of the transmitter antenna are desired.

The vertical antenna of my invention, when mounted upon a vertical standard may project for a number of feet, and, therefore, I provide a special mounting which will absorb shocks accidentally imposed thereupon when passing under low bridges and the like and is collapsible when the vehicle is to be stored within a garage or the like.

I may also provide a pilot whip for the antenna to swing the antenna out of position to avoid any contact thereof with obstructions of various kinds; and, either in combination therewith, or in the alternative, I may provide a special bumper or shock absorber on the antenna itself to cushion the effect of any physical shock imposed directly on the antenna.

The entire antenna system forms a compact, easily adjustable mechanism so that whatever the frequency utilized for the transmission of energy, the antenna may be adjusted for a maximum effective height and power radiation efficiency.

It is, therefore, an object of my invention to provide a novel vertical antenna of automatically and manually variable impedance characteristics.

Another object of my invention is to provide a sectionalized antenna, the current distribution in which is adjustable for different frequencies.

A further object of my invention is to provide a novel antenna for a mobile unit which is shock mounted and which is pivotable so as to conveniently pass under obstructions such as low bridges and the like.

A further object of the present invention is to provide means for swinging the antenna out of position to avoid physical shocks, and, in combination therewith, or, in the alternative, to provide shock absorbing means on the antenna itself.

Another object of my invention is to provide for a sectionalized antenna having a loading coil, the effective turns of which are adjustable.

Still another object of my invention is to provide for a sectionalized antenna having a sectionalizing coil which is adjustable by automatic means operative from a remote point to provide maximum radiation efficiency.

These and other objects of my invention will in part be apparent, and, where not apparent, pointed out in the following description and drawings in which:

Figure 3 is a cross-sectional view taken on line 3—3 of Figure 1.

Figure 4 is a cross-sectional view, partly in plan, taken on line 4—4 of Figure 3 looking in the direction of the arrows.

Figure 5 is a cross-sectional view partly in elevation taken on line 5—5 of Figure 8 looking in the direction of the arrows.

Figure 6 is a cross-sectional view, partly in elevation, taken on line 6—6 of Figure 8 looking in the direction of the arrows and showing a different position of the members of Figure 5.

Figure 7 is a cross-sectional view, partly in elevation, taken on line 7—7 of Figure 8 looking in the direction of the arrows.

Figure 12 is a view in perspective showing one manner in which my sectionalized antenna may be mounted at the top of a vehicle with a pilot whip for moving the same out of position to avoid an obstruction.

Figures 13 and 14 are views in perspective showing modifications in the construction of the apparatus of Figure 12.

Figure 1:
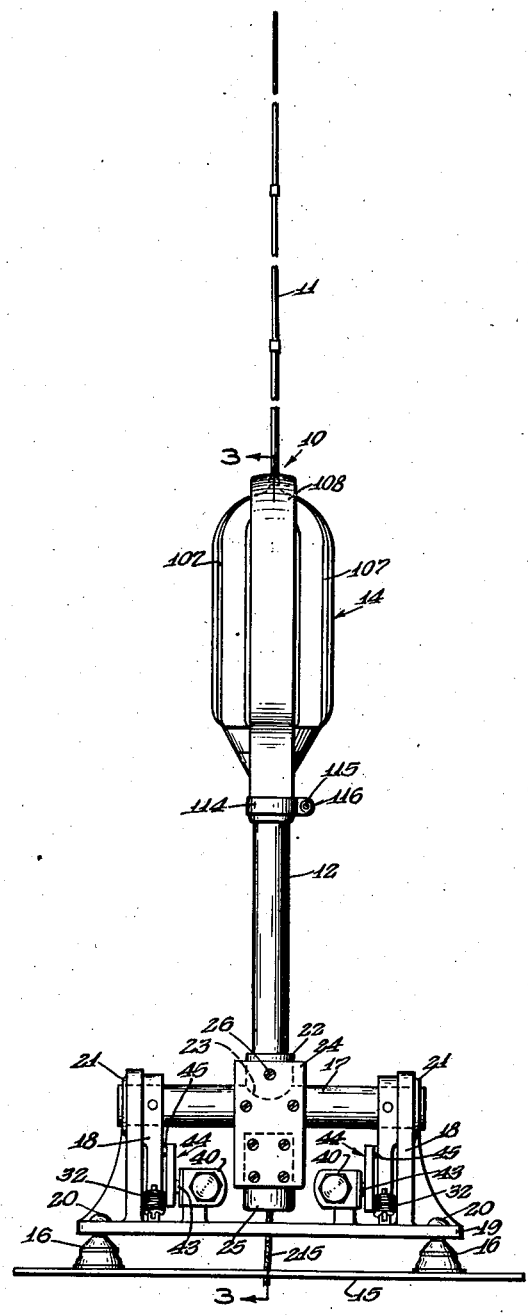
Figure 1 is a front view of my novel sectionalized antenna and the mounting thereof.
Figure 2:
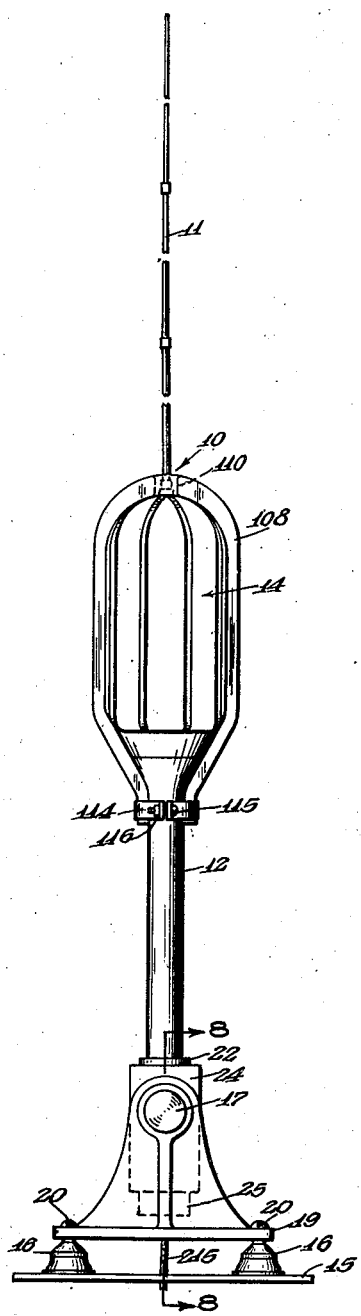
Figure 2 is a side view of the sectionalized antenna of Figure 1.

Referring now to Figures 1, 2 and 3, I have here shown my novel sectionalized antenna 10 which comprises an upper vertical current radiator 11 and a lower vertical radiator 12 separated from each other by the insulating block 13 (see especially Figure 3).

The bulb-like housing 14 acts as a connecting member for securing the upper section 11 to the insulator 13 and in addition contains the necessary sectionalizing impedance which may be in the form of an adjustable loading coil or a variable condenser (hereinafter described).

The entire antenna structure is pivotally secured to the frame 15 of a vehicle, the securing means comprising shock absorbing insulating members 16 which may be made of sponge rubber or other insulating material.

A shaft 17 is rotatably mounted in bearings 21, 21 of the supporting brackets 18, 18, the said supporting brackets being in turn secured to a base plate 19. The base plate 19 is secured in any suitable manner as, for instance, by the bolts 20, 20 to the shock absorbing mountings 16.

Figure 8:
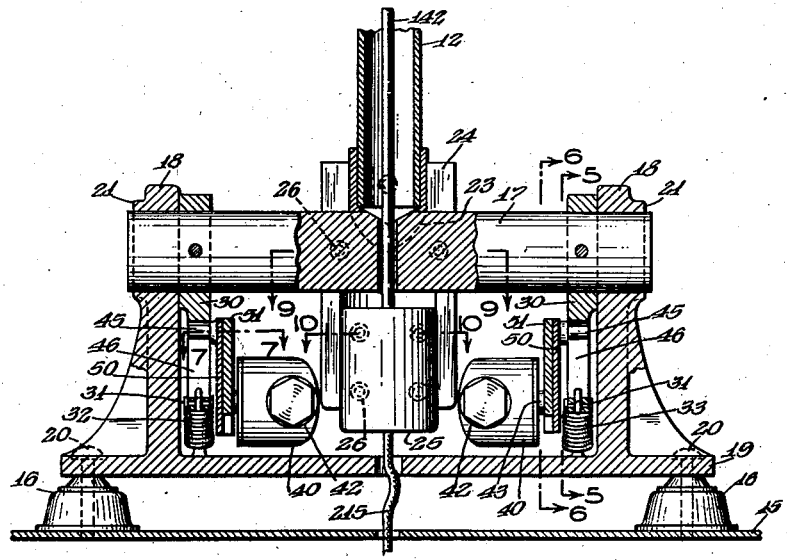
Figure 8 is a cross-sectional view, partly in elevation, taken on line 8—8 of Figure 2 looking in the direction of the arrows.
Figure 9:
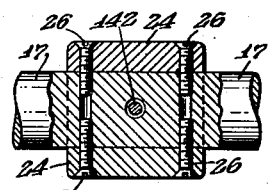
Figure 9 is a cross-sectional view taken on line 9—9 of Figure 8.
Figure 10:
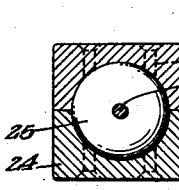
Figure 10 is a cross-sectional view taken on line 10—10 of Figure 8.
Figure 11:
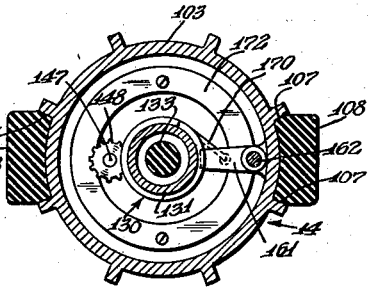
Figure 11 is a cross-sectional view taken on line 11—11 of Figure 3 looking in the direction of the arrows.

The lower vertical radiator 12 is secured in the tubular supporting bracket 22 which, in turn, is inset in a recess 23 in the rotatable shaft 17 (see also Figure 8). The tubular member 22 and hence the lower end of the lower vertical radiator 12 is clamped in place by means of the clamping plates 24, 24 which are recessed and hollowed out to surround the tubular member 23 and which are also hollowed out, as seen in Figures 8 and 10, in order to provide a housing for the motor and variable impedance coil operating housing 25.

The clamping plates 24 are secured to each other on either side of the rotatable shaft 17 by bolts 26, 26, which bolts pass through a portion of the tubular antenna supporting member 22 and also the shaft 17 and surround the motor housing 25 and thus serve securely to hold the motor housing 25 in place and to securely position the lower end of the radiator with respect to the shaft.

Accordingly, the shaft 17 and the entire radiator 10 may rotate with respect to the frame 15 of the vehicle on which the apparatus is mounted. The shock absorber 16 will serve to preclude any damaging stresses from being transmitted to the supporting structure 15. The pivotal arrangement of the entire structure will permit the entire antenna structure above the shaft 17 to be revolved to a horizontal position.

Such horizontal position may be obtained by manually grasping and rotating the antenna or will occur if the antenna should strike a low object. The pivotal arrangement for the vertical radiator is, however, such that the entire antenna structure 10 is self-erecting and there is a normal bias tending normally to maintain the entire antenna structure 10 in a vertical position.

The members for normally maintaining the entire radiator 10 in vertical position comprise a pair of crank arms 30 fixedly mounted on the rotating shaft 17 and so arranged that rotation of the shaft 17 results in rotation of the crank arms 30 and any force imparted to the crank arms 30 will result in corresponding rotation of the shaft 17.

The end 31 of each crank arm 30 is connected to the tension springs 32 and 33, the opposite end of each tension spring being connected at 34, 35 to brackets on the base plate 19.

It will thus be clear that any force which may tend to rotate the vertical antenna structure 10 to a horizontal position, for instance in a counterclockwise direction, will result first in a slight compression of spring 32 and an extension of spring 33, and continued rotation will result, as seen particularly by the dotted lines of Figure 5, in an extension of both of the tension springs 33 and 32.

This will normally tend to cause the crank arm 30 to rotate once more to the position shown by the solid lines of Figures 5 and 6 to cause the vertical antenna structure 10 to erect itself once more in vertical position.

The tension springs 33 and 32 hence serve accurately to align the vertical antenna structure and by working against each other to maintain the vertical antenna structure in a position normal to the plate 19 and hence to the surface 15 of the frame structure to which the entire apparatus is connected.

Since the mounting for the antenna structure thereby achieved is a floating one and hence may respond to various vibrations transmitted to the structure through the frame 15 and thus cause the antenna structure to vibrate unduly, I also provide means for damping the effect of the springs 32 and 33 so that they will normally be extended only when a specific force is applied to the antenna structure 10 to rotate the same; and so that they will not normally permit rotation of the antenna structure under the influence of vibratory stresses which should not cause the antenna structure to assume a position other than vertical.

Various types of damping members may be used. Thus, for instance, dashpots 40 may be mounted on the plate 19 of the antenna structure by means of brackets 42 and in any other suitable manner.

The dashpot 40, as is seen in Figures 5 to 8 inclusive, has a shaft 43 extending therefrom. The dashpot is so arranged that it resists rotation of the shaft 43 and hence damps any force which tends to cause rotation of the shaft 43. An extensible crank arm 44 is secured to the shaft 43 and rotatable therewith. The crank arm 44 has a pin 45 at the free end thereof, the said pin 45 registering in the slot 46 of the crank arm 30.

Any rotation of crank arm 30 will through the pin 45 and slot 46 arrangement cause the crank arm 44 of shaft 43 to rotate and hence any movement of the crank arm 30 will be resisted by the damping effect of the dashpot 40.

As will be seen, however, from Figures 5 and 6, the rotation of crank arm 30 around the shaft 17 causes the various portions of the crank arm 30 to change their distance with respect to the dashpot 40 and the crank arm 44 thereof. Accordingly, in order to ensure that there will always be an operative engagement between the dashpot 40 and the crank arm 30, the slot 46, rather than a pivotal arrangement, is necessary for securing the pin 45 of the dashpot to the crank arm 30.

Also the crank arm 44 of the dashpot must necessarily be extensible in order that an appropriate engagement may exist between the dashpot and the crank arm 30. For this purpose the crank arm 44 which is attached to the shaft 43 of the dashpot 40 is a double member consisting of a crank arm 50 directly secured to the shaft 43 and a slide member 51 which is slidable on the arm 50 (see particularly Figures 6 and 7). The pin 45 is carried on the free end of the slide member 51.

While the member 51 is slidable on the member 50, it nevertheless has the same radial relation to the shaft 43 as does the member 50. Now as seen in Figure 6, when the vertical antenna structure is rotated from the position shown by the solid lines to the position shown by the dotted lines, the dashpot arm 44 is still connected to the crank arm 30 of the vertical antenna structure since an extension of the member 51 on the member 50 occurs.

The springs 33 and 32 would normally tend to snap back the vertical antenna structure violently and thus cause an excessive vibration thereof, but the dashpot 40 through its crank arm 44 resists this sudden action and slows it up so that the antenna structure is brought back slowly and vibration is impeded.

In this manner, the vertical antenna structure may readily be swung out of position either manually or by any obstructing force which may come in contact therewith and may readily swing back into position upon relaxation of such force, and any undue or unnecessary vibration is obviated.

While I have thus far shown and described the mounting of my antenna structure as one which will permit the antenna structure to be swung out of the way by a manual force applied to the antenna structure or any other motive force applied thereto or in the alternative by its striking an obstruction, additional means may nevertheless be provided to work the antenna structure so that it will not be struck by any obstruction and so that it will be swung out of the way immediately before such an obstruction is reached.

For this purpose, as seen in Figures 12, 13 and 14, I may provide what I have termed a pilot whip arrangement 60 which will first come in contact with the obstruction and will be operated thereby to swing the antenna structure out of the way.

As seen, for instance, in Figure 12, the vertical antenna structure 10 is mounted on the top of moving vehicle 15 by means of the base plate 19 and the other structures hereinbefore described. A pilot whip 60 is pivotally mounted on brackets 61, 61 and is normally supported by a spring bias or in any other suitable manner in the vertical position shown in Figure 12. The pilot whip 60 has sufficient height to contact any obstruction which may normally strike the antenna structure or the more essential parts thereof, as, for instance, the bulb-shaped member 14.

When the pilot whip 60 strikes an obstruction, it will, in the modification shown in Figure 12, be deflected to close a switch to a motor 63 which will immediately wind up the cable 64 attached to the antenna structure 10 and deflect the same to the position shown by the dotted lines of Figure 12. The antenna may then be held down either by the motor itself or by the obstruction under which it passes until the obstruction has been passed, and the erecting structure, consisting of the springs 32 and 33 previously described, will serve to cause the antenna to assume a vertical position. Or a snap locking member 65 may be mounted on the posts 66 to secure the antenna in the lower dotted line position when the antenna has been depressed and to hold the antenna in the depressed position until it is manually or otherwise positively released so that the springs 32 and 33 may operate to erect the same.

Various types of apparatus may, of course, be utilized following the same principles. Thus, for instance, the pilot whip 60' of Figure 13 may be arranged so that when it is moved to the dotted line position of Figure 13, it will actuate the switch member 70 to initiate the operation of the vacuum motor 71 which may be operated from the intake manifold and thus cause its shaft 72 and hence the crank arm 73 to rotate.

The crank arm 73 may be connected by cable 74 to a bracket 75 on the antenna structure 10 and thus serve to rotate the antenna structure 10 in a counter-clockwise position with respect to Figure 13 and hence lower the same.

The rotation once more of the pilot whip 60' to the position shown by the dotted lines of Figure 13 when the obstruction is removed may operate the switch member 70 to permit the antenna 10 to be raised either by the vacuum motor 71 or by its own springs 32 and 33.

In another and preferred modification as shown in Figure 14, the antenna structure 10 may be connected by a cable or link 80 to a crank arm 81 fixedly mounted on a shaft 82 which in turn is rotatably mounted in its brackets 83 and 84. Crank arm 85 is also fixedly mounted on the shaft 82 and may extend to one side of the mounting plate 19 of the antenna structure 10.

A link 86 may be pivotally connected to the crank arm 85 at one end and the other end pivotally connected to the crank arm 87 which, in turn, is fixedly mounted on the rotating shaft 88 which rotates in its brackets 89 and 90. The pilot whip 91 may be fixedly mounted on the shaft 88 and rotatable therewith. The crank arm 88 is also mounted to one side of the mounting plate 19 so that the link 86 connected between the crank arms 85 and 87 may clear the side of the antenna mounting structure.

Now, when the pilot whip 91 is struck by an obstruction, it will rotate in a counterclockwise direction with respect to Figure 14 and thus rotate the shaft 88 and hence the crank arm 87. Rotation of crank arm 87 will through the link 86 cause rotation of crank arm 85, which will, in turn, rotate the shaft 82. Rotation of shaft 82 will rotate crank arm 81 and hence exert counterclockwise pull on the cable or link 80 and thus cause a rotation of the antenna structure 10 in a counterclockwise direction so that it will be depressed in horizontal position.

The advantage of the construction shown in Figure 14 is that there is a direct positive mechanical linkage between the pilot whip 91 and the antenna structure 10 so that as soon as any rotative motion is initiated with respect to the pilot whip 91, corresponding rotative motion will be transmitted to the antenna structure 10.

No spring or other means need necessarily be provided to cause the pilot whip 91 to move once more to erected position when the obstruction is passed, since the erecting spring 32 and 33 of the antenna structure will not only serve to erect the antenna but through the mechanical linkages above set forth will also cause the pilot whip 91 to be erected once more.

In any of the structures above described, however, the essential requirement is that the pilot whip be so linked to the antenna structure as to cause a rotation of the antenna structure toward a horizontal position before the obstruction is reached.

The lower section 12 of the vertical radiator, as has been pointed out above, is a hollow tube. The upper end of this tube is flared at 100 to provide an appropriate support for the insulating block 13. The insulating block 13 has an annular shoulder 101 which registers with the end 100 of the tube 12 and thus serves accurately to position the block 13 with respect to the tube 12. The insulating block 13 also has an upper annular recess or shoulder 102 in order accurately to position the cylindrical metallic member 103 with respect thereto.

The cylindrical metallic member 103 is closed at its upper end at 104 and therefore when this member is positioned on the insulating block 13 and appropriately secured thereto, the interior of the metallic member is sealed from the atmosphere.

The cylindrical metallic member 103 forms the interior lamination or surface of the bulb-like housing 14. The metallic cylinder 103 has a plurality of vertical fins 107 projecting therefrom (see particularly Figures 1, 2 and 3) in order to rigidify and strengthen the structure. These metallic vertical fins 107 also provide an acurate positioning means for a rubber bumper 108 which may consist of a longitudinal strip of material arranged in such manner that one section thereof is positioned between the vertical fins 107 on one side of the housing 14 and the other section is positioned between the vertical fins 107 on the opposite side of the housing, as seen in Figures 2 and 3; a portion of the rubber bumper 108 going over the top of the housing 14 and being suitably perforated at 110 to permit the upper vertical antenna section 11 to project therethrough.

The bumper of suitable shock absorbing insulating material may then be securely positioned in place by extending the ends 111, 111 thereof down onto the outside of the tube 12 beneath the housing 14 and by securing a collar 114 around the neck 111—111 thus formed. The said collar 114 may then be held in place in any suitable manner as, for instance, by the screw 115 passing through flanges of the collar and held by the nut 116.

By this means, therefore, the rubber bumper may readily be replaced should it become worn or damaged by reason of contact with obstructions. It will be necessary merely to remove the upper antenna rod 11 in the manner hereinafter set forth and loosen the collar 114, slip another bumper 108 in place in the manner shown in Figures 1 to 3, replace and tighten the collar 114 and replace the upper rod 11.

The material for bumper 108 and insulating block 13 should be of an insulating material such as a polystyrene compound good for radio frequency. If a suitable radio frequency insulating material cannot be used for bumper 108 then the bumper 108 should not extend down around tube 12. Or, in the alternative, bumper 108 may by-pass the insulating block 13 and be spaced therefrom by a substantial air gap, and sufficient material should be provided in the bumper between antenna sections 11 and 12 to provide a sufficiently long creepage path.

The upper portion of the inner metallic cylinder 103 may have an integral boss 120 connected thereto, the said boss being tapped at 121 to permit the insertion of the threaded end 122 of the upper vertical antenna section 11, the said upper antenna section being then rigidly secured in place by means of the knurled bushing 124.

It will thus be seen that the upper antenna section which comprises essentially the metallic enclosure 103 and the vertical radiator 11 is effectively insulated from the lower tubular radiator 12 by the insulating member or block 13.

An inductor 130 comprising a plurality of helically wound turns mounted upon a tube 131 of insulating material is vertically aligned and supported within the housing 14 and hence in the interior of the metallic cylinder 103.

The insulating tube 131 is rotatably mounted upon a vertical integral rod-like extension 133 of the insulating block 13 and may rotate with respect thereto. In order to rigidify the entire structure, the integral vertical extension 133 is threaded at its upper end 134 and inserted in the tapped opening 135 of the lower integral boss 136 of the upper part of the metallic cylinder 103.

The upper part of the insulating tube 131 may rotate loosely with respect to the boss 136 or, if desired, any suitable friction reducing or spacing means may be located therebetween. The lower end of the insulating tube is connected by means of a friction reducing ball bearing structure 140 to the insulating block 13, thus facilitating the rotation of the insulating tube 131 and the coil 130 with respect to the block and with respect to the remainder of the housing.

The insulating tube 131 and hence the coil 130 may be caused to rotate in any suitable manner. A preferred means shown in the drawings comprises a vertical shaft 142 which is mounted within the lower tubular radiator 12. The lower end of the shaft 142 is connected to and driven by a motor within the housing 25 at the lower end of the antenna structure.

The upper end of the shaft is suitably rotatably positioned by a ball bearing structure 144 in the lower end of the insulating block 13. A driving gear 145 positioned at the upper end of the shaft 142 is connected with and drives a pinion 146 which, in turn, is positioned on the rotatable shaft 147, the said shaft 147 being rotatable within a vertical opening in the insulating block 13.

The upper end of the shaft 147 on the upper side of the insulating block 13 carries a gear 148 which meshes with the gear 149 (see particularly Figure 4) on the lower end of the tube 131 and thus transmits rotative force from the shaft 142 and the small shaft 147 to the tube 131 and hence to the coil 130.

It will thus be obvious that operation of the motor contained within the lower housing 25 in either direction will result in rotation of the shaft 142 and through the gears 145 and 146 and the shaft 147 and through the gears 148 and 149 will result in corresponding rotation in either direction of the insulating tube 131 which carries the coil 130.

The individual turns of wire on the coil 130 may either be spaced from each other and hence be insulated from each other by a layer of air or they may be insulated by any suitable varnish or other insulating coating and wound close together. The outer surface 160 of the coil 130 in the latter case is, however, so scraped or otherwise formed that the wires are bare and hence may make suitable electrical contact with the conductive follower 161.

The conductive follower 161 is slidably mounted on the vertical metallic shaft 162, the said vertical metallic shaft being secured by the brackets 163, 164 to the interior of the metallic cylinder 103. The lower end of the coil 130 is electrically connected by the wire 170 to the contact brush 171 which is secured to the tubular member 131 and rotates therewith. The contact brush 171 is always in contact with the metallic ring 172 on the upper surface of the insulating block 13. The said ring 172 is electrically connected by the wire 173 passing through a vertical perforation in the block 13 to the upper end 180 of the lower vertical antenna tube section 12. The portions of the coil 130 remote from the lower end thereof may be electrically connected to the upper vertical antenna section 11 through the conductive follower 161, the shaft 162, the metallic cylinder 103 and the integral boss 120 which connects the upper vertical antenna section 11 to the cylinder 103.

Hence, in the construction shown in Figure 3, the lower vertical antenna section 12 and the upper vertical antenna section 11 have an inductance or loading coil 130 therebetween, the lower end of the coil being connected to the lower vertical antenna section and selected portions of the coil 130 remote from the lower end thereof being connected through the conductive follower 161 to the upper vertical antenna section.

As previously mentioned, the impedance or loading characteristics of the coil may be varied by the operation of the motor contained within the housing 25 and consequent rotation of the coil 130. The end of the conductive follower 161 is so arranged that it engages with the turns of the coil 130 and is driven thereby upon its shaft or slide 162. For this purpose the turns of the coil 130 act as a screw, the rotation of which drives the conductive follower.

As the conductive follower changes the position at which it contacts the coil, the loading or impedance characteristics of the coil are consequently varied, and the characteristics of the antenna structure 10 are accordingly changed.

The upper end of the coil 130 is electrically free and mechanically fixed to the upper end of the tube 131. It is obvious, therefore, that the number of turns interconnecting the lower vertical radiator 12 with the upper vertical radiator 11 will thus be dependent upon the position of the follower 161 and hence will be determined by the rotation of the insulating tube.

Since, as previously mentioned, in a sectionalized antenna, the current distribution is determined by the individual inductive and capacitative reactances of the sections for a particular frequency, it will be clear that the sectionalized antenna illustrated may be adjusted by rotation of the shaft 142 to efficiently transmit any one of a predetermined range of frequencies. The exact position of the conductive follower 161 for any frequency may, of course, be determined by actual calculation or experiment.

The radio frequency energy to be transmitted is coupled directly to the base of the lower vertical radiator 12 and, accordingly, the radio frequency current flows upward along the vertical antenna through the sectionalizing coil contained in the enclosure 14 and through the vertical rod section 11. The utilization of the sectionalizing coil and the upper and lower radiators 11 and 12, respectively, thus permits the current in the upper sections of the antenna to be at a maximum value.

While in Figure 3 I have shown an arrangement whereby there is no direct connection between the top of the coil 130 and the upper vertical radiator 11 but rather wherein the conductive follower to a particular portion of the coil is the sole connection between the coil and the upper radiator—the upper end of the coil may nevertheless be directly connected to the upper vertical radiator 11. In this latter case, the conductive follower 161 may nevertheless be used and the movement thereof along the coil 130 will nevertheless serve to change the frequency characteristics of the antenna.

In addition, in appropriate constructions or wherever it may otherwise be desirable, one end of the coil may be directly connected to the upper vertical radiator 11 and the conductive follower may be electrically connected to the lower radiator 12 to produce substantially the same results.

Since for the novel antenna disclosed, the entire vertical structure is pivoted about the shaft 17, it is necessary that the power transmitted for rotating the vertical shaft 142 be correspondingly pivotable. As illustrated, therefore, in Figures 1 to 3, the enclosure 25 contains a driving mechanism including an electric motor and controlling mechanism for determining the rotation of the coil 130 for any particular frequency. This electric motor rotates the shaft 142 and is controlled by a contact mechanism which is automatically operative from the control box of Figures 15 and 16 to rotate the coil 130 so that the follower 161 assumes the correct position for the frequency to be transmitted. This is accomplished by an adjustable contact mechanism which includes a contact for each of the predetermined positions of follower 161.

Further, this automatic mechanism may, if desired, be disconnected and a manual mechanism may be employed to cause the rotation of the coil 130 to any extent so that the follower may assume any position between zero inductance (which would correspond to the follower being at the lower end of the coil) to a maximum inductance (which would correspond to a position of the follower at the upper end of the coil). The maximum inductance of the coil may, of course, be predetermined for a particular installation.

Figure 17:
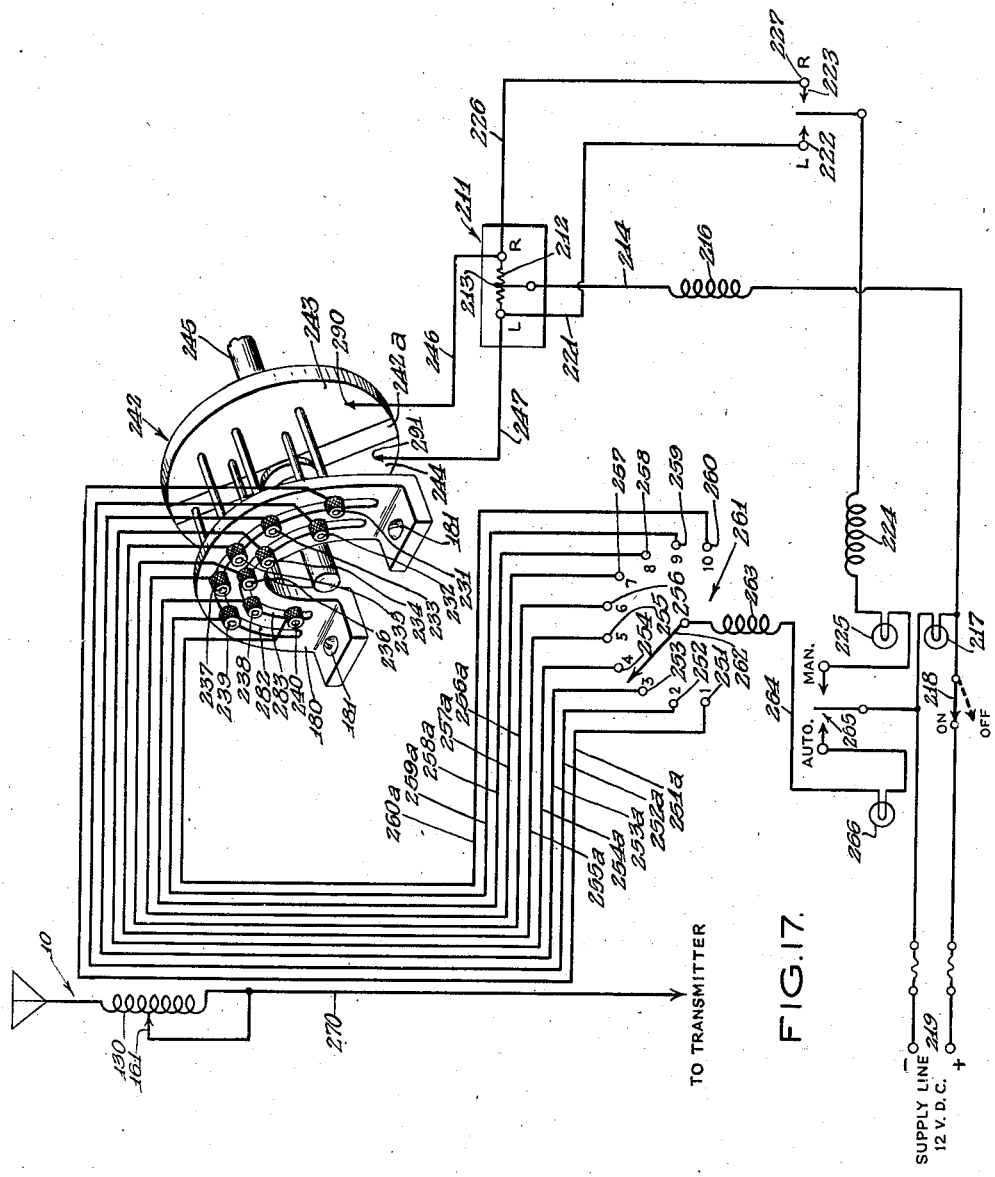
Figure 17 is a schematic diagram of a control system for my adjustable sectionalized antenna.

In Figure 17 I have schematically illustrated a control system for adjusting the impedance of the coil by insertion of more or less coil turns to vary the tuning of the antenna.

I provide a motor which I have schematically illustrated at 211 having a field winding 212, the midpoint of which is tapped at 213 to the conductor 214. The armature of this winding is connected in shunt across the current supply and in series with the radio frequency choke coils 216 and 224 in the usual manner and, accordingly, is not specifically illustrated here.

The conductor 214 may be carried through the tube or cable 215 (of Figure 3) and thence through the radio frequency choke coil 216 to the positive side of the current supply 219. An indicator lamp 217 and an on-off key 218 are also connected in circuit with the current supply 219. The illumination of the lamp 217 indicates that the key 218 is closed in operative position.

The "L" terminal of the field winding 212 of the motor 211 extends over the conductor 221 to the "L" contact 222 of the switch 223 and thence over the radio frequency choke coil 224 and the indicator lamp 225 to the negative side of the current source 219.

As will hereinafter more specifically be described, when the manual tuning switch 223 is moved to engage contact 222, a circuit is completed for driving the motor 211 in a predetermined direction.

The opposite terminal "R" of the field winding 212 of the motor 211 is connected over a conductor 226 to the "R" contact 227 of the manual switch 223 and thence through the radio frequency choke coil 224 and the lamp 225 to the negative side of the current supply 219. When switch 223 is moved to contact 227, a circuit is completed for driving the motor in a direction opposite to that when the circuit is completed through the contact 222.

A plurality of individually adjustable wiping contactors 231 to 240 are mounted in such manner that they are in sliding engagement with the disk 242. The disk 242 and the wiping contactors 231 to 240 in contact therewith are here illustrated schematically but it will be understood that, in general, the disk is arranged to make contact with all but one of the sliding contactors 231 to 240 at any one time.

To this end, in one form of my invention I provide this disk in the form of two sectors 243 and 244 separated from each other and insulatingly spaced from each other by insulating material 242a. The disk is mounted on shaft 245 which is driven by the motor 211 and as it rotates with respect to the contacts to cause them to wipe thereover, one of the contacts 231 to 240 will move out of wiping contact with the face of one sector of the disk and into the slotted or insulating portion 242a, as illustrated by the position of the contactor 237 in the drawings.

Each of the sectors 243 and 244 which make up the disk 242 with its slotted or insulating portion 242a are thereby insulated from each other and the sector 243 is connected by sliding contact 290 over wire 246 to the "R" terminal of the field winding of the motor, the other sector 244 being connected by sliding contact 291 over wire 247 to the "L" terminal of the field winding of the motor.

Each of the contactors 231 to 240 is connected individually by appropriate wires to the contacts 251 to 260 of the distributor 261. Distributor 261 is provided with the rotating brush 262 which may be moved to engage any one of the contacts 251 to 260. The brush 262, in turn, is connected over the radio frequency choke coil 263 through the conductor 264 to the automatic terminal of switch 265 and thence to the negative side of the current supply 219. A lamp 266 is also provided for indicating the arrangement of the switch in the automatic position.

Figure 15:
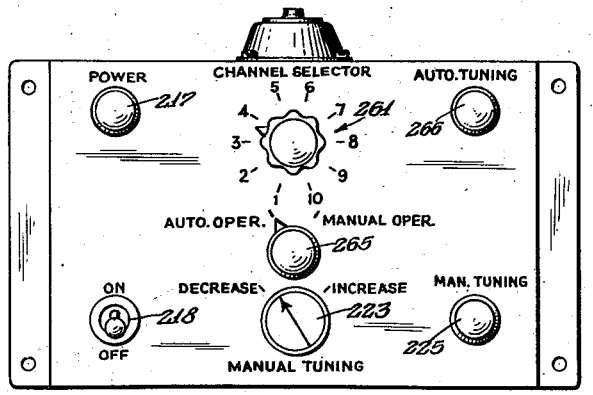
Figures 15 and 16 are front and side views respectively of a control box for my adjustable sectionalized antenna.
Figure 16:
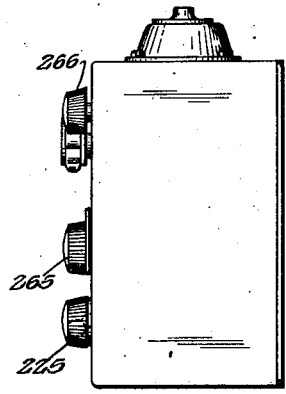

As may be seen in Figures 15 and 16, the various members hereinbefore described may be controlled by various knobs located on the outside of the control box and the various indicating lamps may likewise be positioned to be visible from the control box.

Thus corresponding reference numerals on the outside of the control box indicate the relative position of the various operating members already described. Thus, for instance, the decrease-increase switch 223 may be manually operated by the knob bearing the corresponding number on the control knob.

Similarly, the manual and automatic switch 265 may likewise be operated by appropriate control knobs. The on-off switch 218 is likewise available for manual operation on the outside of the control box and the signalling lamps 217, 225 and 266 which indicate the conditions of the various circuits are likewise visible from the outside of the control box. Each of the contacts 251 to 260 of the distributor 261 corresponds respectively to the numerals 1 to 10 on the outside of the control box surrounding the distributor brush control knob.

The operation of the circuits should now be obvious. The operator, having first predetermined the particular frequency to which he desires to tune his antenna, and having therefore determined the adjustment necessary of the impedance of the coil for effecting the necessary resonance, will set the distributor brush 262 to engage the particular contact member of the contacts 251 to 260 for effecting such adjustment. At the same time, the switch 265 will be moved to engage its left-hand contact or the contact which closes the circuit for the automatic adjustment mechanism, and the on-off switch 218 will be operated to its closed position. Operation of switch 218 will illuminate lamp 217, indicating that voltage is being supplied for operation of the apparatus. Operation of switch 265 also closes the circuit for lamp 266 which by its illumination indicates that the automatic equipment is in operating condition.

Current will then flow from the negative side of the current supply source 219 over the automatic side of the contact or switch 265, thence through the conductor 264 and the radio frequency choke coil 263 to the distributor brush 262. Thence, for instance, should the distributor brush 262 be in engagement with contact or distributor contact 254, current will flow through contact 254 and the conductor 254a over contact 234 and sector 243, and thence through conductor 246 through the right-hand portion of the field winding 212 of the motor 211 over the mid-tap of the field winding and thence through conductor 214 and through the radio frequency choke coil 216, on-off switch 218 to the positive side of the current supply.

Current over this circuit will drive the motor 211, which, in turn, through the mechanical drive described above, will rotate the shaft 142 carrying the impedance coil, while at the same time driving the disk 242 on its shaft 245. As the impedance coil rotates, the conductive contactor 161 for the coil is moved in a vertical path altering the amount of impedance in the antenna circuit.

Simultaneously with the rotation of the vertical shaft 142 which rotates the inductance, the motor 211 also rotates the disk 242 which has been arranged so that when a predetermined amount of impedance has been inserted in the antenna circuit, the disk 242 has moved until the slotted insulating portion thereof 242a is opposite the contactor 234, which thereupon breaks the motor circuit traced above.

As a result, the motor is automatically brought to a stop simultaneously with the insertion of the predetermined amount of impedance in the antenna circuit.

Shaft 245 carrying disc 242 is geared to the motor in such a manner that rotation of the disc 242 through an angle of the order of 175° will correspond to a rotation of shaft 142 to cause impedance 130 to rotate through a full range of adjustment.

Similarly, whenever any other operating frequency for the antenna is desired which requires insertion of a predetermined amount of impedance to render the antenna resonant at the desired frequency, the distributor brush 262 will be set on that one of the contacts 251—260 corresponding to the desired frequency or antenna impedance and the motor 211 will thereupon drive the coil until the predetermined amount of impedance has been inserted in the circuit; whereupon the motor circuit will automatically be disconnected by the movement of the disc 242 to a position where that one of the contactors 231—240 which corresponds to the setting of the brush 262 is moved into the slotted portion 242a of the disc 242.

It will be understood that each of the contactors 231 to 240 and its associated distributor contacts 251 to 260 represents a predetermined impedance on the antenna circuit and a corresponding frequency range of the radio antenna.

In order to set the antenna for some specific frequency within the frequency range of any one of the contactors 231 to 240, each of these contactors is made adjustable for movement along the disc 242 so that it is possible not only to adjust the antenna to a particular frequency range but also to more specifically adjust it to a very specific frequency within that range. Each of the contacts 231 to 240 is adjustable along the disc 242 between its two adjacent contactors.

Thus, for instance, the contacts 231 to 240 may be mounted upon a semi-circular mounting plate 180 which may be secured as, for instance, by the bolts 181 to any suitable support within the housing 25. The mounting plate 180 may be provided with elongated semi-circular slots 282, 283 within which the ends of each of the contacts 231 to 240 may be slidably positioned. Knurled knobs on the ends of each of the contacts 231 to 240 may be provided in order to effect securement of the contacts 231 to 240 in any desired position with respect to the disc 242; such securing means may be loosened so that the contacts 231 to 240 may be moved to any other adjustment or arrangement and then once more secured in position thereat. The two slots 282, 283 are provided so that adjacent contactors (for instance, 231 and 232) may be moved very close to each other, which otherwise would be made difficult by the diameter of the knurled securing members.

Mounting plate 180 may be of insulating material. Or, if desired, for structural purposes, it may be of metal and the contactors 231 to 240 may be appropriately insulated from each other and from the mounting plate.

By this means, therefore, any range of frequencies may be provided for and any adjustments may be made in the apparatus to provide a varied selection of frequency ranges as particular problems may require. Also any selection and spacing of various frequency ranges within the range of the antenna structure may be obtained.

Suitable means may be provided (especially where manual adjustment is to be made) to prevent excessive rotation of coil 130 which would otherwise permit the conductive follower 161 to move beyond the end of coil 130. Such means may be provided in connection with shaft 245 or disc 242 to break the circuits to the motor along either conductor 226 or 221, depending on the direction of rotation of the disc 242 and the coil 130.

Thus, when the limit of rotation in the "increase" or "raise" direction is reached, the circuit should be opened at conductor 226, while conductor 221 still permits operation in the opposite direction to "decrease." Also, when the limit is reached in the opposite conductor, the circuit should be opened at conductor 221, while conductor 226 permits an "increase" operation.

The radio frequency choke coils which are inserted in each of the circuits serve to prevent radio frequency currents which may be induced in the motor circuits from interfering with the operation thereof. When the antenna is insulated entirely from the motor circuits, choke coils may not be necessary. Another purpose of the choke coils is to prevent radio frequency currents from leaking to ground from the antenna.

In the event that it is desired to make the adjustments manually (for calibrating purposes to obtain frequency ranges between the predetermined frequency range letterings) instead of automatically, the switch 265 is moved to engage its manual contact. The on and off switch 218 is then operated to its closed position which immediately illuminates the lamp 217, and lamp 225 is also illuminated, indicating that the apparatus has been set for manual adjustment. Switch 223 is then operated to engage either the contact 222 or 227, depending upon whether the amount of inductance to be inserted is to be increased or decreased.

If the switch is moved to engage contact 222, a circuit is completed from the negative side of battery through the switch 265 in engagement with its right-hand or manual contact over the radio frequency choke coil 224, switch 223 in engagement with its left-hand contact 222 over the conductor 221 to the left-hand side of the field winding 212 of the motor 211 and thence over the common conductor 214, radio frequency choke coil 216, on-off switch 218, to the positive side of the current supply. The motor will thereupon be driven by the current flowing therethrough over the circuit described above and will vary the amount of impedance of the loading coil 130 in the antenna circuit. When the desired amount of impedance has been inserted, the switch 223 is moved to its disengaging position and the on and off switch 218 is disconnected.

Should it be desired to decrease the amount of impedance in the circuit, the switch 223 is moved to engage the contact 227, whereupon the circuit described above is closed except that current from the negative side of battery passes over the contact 227 of switch 223 and through conductor 226 to the right-hand terminal of the field winding, thence through the field winding, and over conductor 214 as traced above.

In the latter case, the current in the field winding drives the motor in the opposite direction from that described in the above circuit for decreasing the impedance in the antenna.

The apparatus may be so arranged that it may be manually operated in the sense that adjustment to any degree might be obtained without reference to the automatic adjustment possibilities obtainable by the use of the distributor 261. Thus, for instance, when the switch 265 is thrown from the automatic side to the manual side thereof, then operation of the on-off key may close the circuit from the negative side of the battery through the lamp 225, the radio frequency choke coil 224, the switch 223, to, for instance, contactor 222 thereof, the conductor 221, to the left hand side of the field winding of the motor, thence through the field winding of the tapped midpoint 213 thereof, the conductor 214, the radio frequency choke coil 216, the on-off key 218 to the positive side of the current source.

In such case, when the switch 265 is set for manual operation and the switch 223 is turned to either raise or lower the impedance closing of the on-off key will operate the motor to cause the sliding conductive member 161 to move to change the impedance; and the change in impedance will stop when the on-off key is opened or when the switch 223 is moved to a neutral position.

The manual operating system above described may be utilized to calibrate and adjust the automatic system.

Thus, by manual operation, the impedance may be varied while the transmitter is in operation so that test equipment indicates that a most effective transmission characteristic is obtained for a specific desired frequency. When this position is obtained, the apparatus is stopped and one of the contactors 231 to 240 is adjusted to a position where its end is in contact with the insulating section 242a of the disk 242.

Thereafter when it is desired to automatically adjust the antenna to transmit this frequency, the distributor brush 262 may be set on that one of the contacts 251—261 corresponding to the specific contact of the group 231—240 which had been adjusted as above. The remaining conductors 231 to 240 may be adjusted in the same manner.

All of the conductors 251a to 260a and the other connections to the disk and motor may, of course, pass through the cable 215 from the antenna structure through the top frame 15 of the vehicle. A suitable connection 270 from the antenna to the transmitter may also be made through the cable 215.

Likewise, it should be clear that while my invention has been described as applicable to a remote control or adjustment of a loading coil for a sectionalized antenna, it may be utilized in connection with other impedance means for the same purpose. Thus, for instance, should a variable capacitance be used instead of the loading coil, the same type of motor operation and the same type of control system may be used to vary the capacitance in order to vary the frequency range of the antenna.

It will be clear that I have thus provided an arrangement for optionally automatically or manually making adjustments in the antenna. These adjustments may be conveniently made from any point and do not require manual operations at the impedance coil, as has heretofore been found necessary. Moreover, both wide and narrow ranges of adjustments are provided, permitting operation of the antenna over a wide range of frequencies.

While for purposes of illustration, I have chosen to illustrate my invention as applied to vertical rods mounted on moving vehicles, it will be obvious to those skilled in the art that the principles herein shown may be applied to antennae generally and I am not limited by the specific example herein given except as set forth in the appended claims.

I claim:

1. In an antenna system, a vertical rod antenna, a loading impedance therefor, remotely operated means for varying the impedance of said antenna, a motor for driving said means, manually operable means for predetermining the impedance of said loading impedance, and means controlled by said manual means for automatically stopping said motor when said impedance has been adjusted to said predetermined amount.

2. In an antenna system, an impedance means therefor, motor driving means for inserting variable amounts of said impedance in said antenna system to adjust the antenna system for any one of a plurality of frequencies, a remotely disposed manual means for predetermining the amount of impedance to be inserted, and means controlled by said manual means for automatically stopping the operation of said motor when a predetermined amount of said impedance has been inserted in said antenna system.

3. In an antenna system, an impedance means therefor, an electric motor, means whereby said electric motor controls the amount of impedance connected in said antenna circuit to adjust the antenna system for any one of a plurality of frequencies, a remotely disposed manual means for predetermining the amount of impedance to be inserted, a source of power for said motor, means controlled by said manual means for automatically stopping the operation of said motor when a predetermined amount of impedance has been inserted in said antenna system and means for preventing radio frequency currents generated in said motor circuits from interfering with said antenna system.

4. In an antenna system, an impedance loading coil therefor, an electric motor, means whereby said electric motor controls the amount of impedance connected in said antenna circuit to adjust the antenna system for any one of a plurality of frequencies, a remotely disposed manual means for predetermining the amount of impedance to be inserted, a source of power for said motor, means controlled by said manual means for automatically stopping the operation of said motor when a predetermined amount of impedance has been inserted in said antenna system and means for preventing radio frequency currents generated in said motor circuits from interfering with said antenna system, said last mentioned means comprising radio frequency choke coils connected in the circuits of said motor.

5. In an antenna system, a loading coil therefor, a motor for controlling the amount of impedance of said loading coil; a pair of disks insulated from each other and having contactors in contacting engagement with each of said disks, and circuit connections from said disk to said motor, and means including said contactors in said circuit connections for predetermining the angle of rotation of said motor.

6. In an antenna system, a loading coil therefor, a motor for controlling the amount of impedance of said loading coil; a pair of disks insulated from each other and having contactors in contacting engagement with each of said disks, and circuit connections from said disk to said motor, and means including said contactors and said circuit connections for predetermining the angle of rotation of said motor, said means comprising a distributor having segments individual to each of said contactors and connected thereto.

7. In an antenna system, a loading coil therefor, a motor for controlling the amount of impedance of said loading coil; a pair of disks insulated from each other and having contactors in contacting engagement with each of said disks, and circuit connections from said disk to said motor, means including said contactors in said circuit connections for predetermining the angle of rotation of said motor, said means comprising a distributor having segments individual to each of said contactors and connected thereto, and means including the distributor brush of said distributor and its segments for completing circuit connections through said motor through said contactors and segments, said circuit connections being interrupted when said segments are rotated by said motor through a predetermined angle.

8. In antenna system, a sectionalized antenna having a remotely adjustable loading coil, remotely operated means for rotating said coil for inserting a variable number of turns in said antenna system, a housing for said loading coil, and a distributor ring for connecting one end of said rotatable loading coil to the lower end of said sectionalized antenna.

9. In combination, a vertical rod antenna, pivotally mounted means operative in the event that said antenna engages an obstruction for rocking said antenna toward a horizontal position, and means for storing energy during said movement of said antenna to a horizontal position for restoring the antenna to its vertical position and means for damping the return movement to a horizontal position.

10. In combination, a vertical rod antenna, pivotally mounted means operative in the event that said antenna engages an obstruction for rocking said antenna toward a horizontal position, and means for storing energy during said movement of said antenna to a horizontal position for restoring the antenna to its vertical position, and means for damping said antenna to control its restoration with a minimum of vibrations, to its vertical position.

11. In combination, a vertical rod antenna, pivotally mounted means operative in the event that said antenna engages an obstruction for rocking said antenna to a horizontal position, and spring means for storing energy during said movement of said antenna to a horizontal position for restoring the antenna to its vertical position, and means comprising a dashpot for damping the restoring movement of said antenna.

12. An antenna structure comprising a vertical rod antenna, pivotally mounted means operative in the event that said antenna engages an obstruction for rocking said antenna toward a horizontal position, and means for storing energy during said movement of said antenna to a horizontal position for restoring the antenna to its vertical position, and means for controlling the restoring of said antenna, with a minimum of vibrations to its vertical position, said entire antenna structure being positioned on an insulating shock absorbing mounting.

13. In combination, a vertical rod antenna, pivotally mounted means operative in the event that said antenna engages an obstruction for rocking said antenna toward a horizontal position, and means for storing energy during said movement of said antenna to a horizontal position for restoring the antenna to its vertical position, means for damping the restoration of said antenna, with a minimum of vibrations, to its vertical position, and a shock absorber mounted on said vertical rod antenna for engaging an obstruction with which the antenna may come in contact and for reducing the shock of said engagement.

14. In combination, a vertical rod antenna, pivotally mounted means operative in the event that said antenna engages an obstruction for rocking said antenna toward a horizontal position, and means for storing energy during said movement of said antenna to a horizontal position for restoring the antenna to its vertical position, and means for damping the restoration of said antenna, with a minimum of vibrations, to its vertical position, said means for rocking said antenna toward a horizontal position comprising a vertically arranged pilot whip, arranged to contact an obstruction before said antenna reaches the obstruction and adapted to be rotated toward a horizontal position by said obstruction, and means operable upon rotation of said pilot whip toward horizontal position to cause said antenna structure to rotate toward horizontal position.

15. In a sectionalized antenna system having a loading inductance coil, a brush contacting the conductor of said coil for connecting said coil to said antenna system, and remotely operated means for rotating said inductance coil to insert varying amounts of said inductance coil into the antenna system for varying the frequency tuning of said antenna system.

16. In a sectionalized antenna system having a loading inductance coil, a brush contacting the conductor of said coil for connecting said coil to said antenna system, and remotely operated means for rotating said inductance coil to insert varying amounts of said inductance coil into the antenna system for varying the frequency tuning of said antenna system, said remotely operated means comprising a motor rigidly connected to said antenna system.

17. In a sectionalized antenna system having a loading inductance coil, a brush contacting the conductor of said coil for connecting said coil to said antenna system, remotely operated means for rotating said inductance coil to insert varying amounts of said inductance coil into the antenna system for varying the frequency tuning of said antenna system, said remotely operated means comprising a motor rigidly connected to said antenna system, and means for rocking said antenna system and motor as a unit in the event said antenna system comes into contact with an obstruction.

18. In a sectionalized antenna system having a loading inductance coil, a brush contacting the conductor of said coil for connecting said coil to said antenna system, remotely operated means for rotating said inductance coil to insert varying amounts of said inductance coil into the antenna system for varying the frequency tuning of said antenna system, and manually operable means for predetermining the extent of rotation of said inductance coil to insert a predetermined impedance in said antenna system.

19. In a pivoted antenna system, a loading coil, a motor for inserting variable amounts of said loading coil in said antenna system, said motor being rigidly connected to said antenna system, and means for rocking said motor and said antenna system about its pivot as a unit in the event said antenna system is engaged by an obstruction.

20. In an antenna system, a loading coil, a metal housing therefor for strengthening said structure, and a rubber bumper encasing said housing to protect said antenna in the event it is struck by an object.

21. In an antenna system, a loading coil, a metal housing therefor for strengthening said structure, and a rubber bumper encasing said housing to protect said antenna in the event it is struck by an object, said metal housing having vertical fins, said rubber bumper comprising longitudinal strips interposed between said vertical fins.

22. In an antenna system, a loading coil, a metal housing therefor for strengthening said structure, and a removable rubber bumper encasing said housing to protect said antenna in the event it is struck by on object.

23. In an antenna system, a loading coil, a metal housing therefor for strengthening said structure, and a rubber bumper of radio frequency insulating material encasing said housing to protect said antenna in the event it is struck by an object.

24. In a sectionalized antenna system, an upper radiator, a lower radiator, an adjustable loading coil electrically connecting said upper and lower radiators, and a housing for said loading coil and for mechanically connecting said upper and lower radiators.

25. In a sectionalized antenna system, an upper radiator, a lower radiator, an adjustable loading coil electrically connecting said upper and lower radiators, a housing for said loading coil and for mechanically connecting said upper and lower radiators, and means for pivotally mounting said antenna structure on a vehicle.

26. In a sectionalized antenna system, an upper radiator, a lower radiator, an adjustable loading coil electrically connecting said upper and lower radiators, a housing for said loading coil and for mechanically connecting said upper and lower radiators, and means for pivotally mounting said antenna structure on a vehicle, said means comprising shock absorbing insulating members.

27. In a sectionalized antenna system, an upper radiator, a lower radiator, an adjustable loading coil for connecting said upper and lower radiators, a housing for said loading coil and for mechanically connecting said upper and lower radiators, and means for pivotally mounting said antenna structure on a vehicle, said means comprising spring members for restoring said antenna to a vertical position with a minimum of vibrations in the event it is engaged by an obstruction.

28. In a sectionalized antenna system, an upper radiator, a lower radiator, an adjustable loading coil for connecting said upper and lower radiators, a housing for said loading coil and for mechanically connecting said upper and lower radiators, and means for pivotally mounting said antenna structure on a vehicle, said means comprising spring members for taking up any shock to the antenna in the event it engages an obstruction.

29. In a sectionalized antenna system, an upper radiator, a lower radiator, an adjustable loading coil for connecting said upper and lower radiators, and a housing for said loading coil and for mechanically connecting said upper and lower radiators, said lower radiator comprising a hollow tubular member and a driving shaft extending through said hollow tubular member for remotely adjusting said loading coil.

30. In a sectionalized antenna system, an upper radiator, a lower radiator, an adjustable loading coil for connecting said upper and lower radiators, and a housing for said loading coil and for mechanically connecting said upper and lower radiators, and an insulating block for insulating said loading coil from said lower radiator.

31. In a sectionalized antenna system, an upper radiator, a lower radiator, an adjustable loading coil for connecting said upper and lower radiators, and a housing for said loading coil and for connecting said upper and lower radiators, said lower radiator comprising a hollow tubular member, a driving shaft extending through said hollow tubular member for remotely adjusting said loading coil, and an insulating block for insulating said upper radiator from said lower radiator and drive connections from said shaft through said insulation to said loading coil.

32. In a sectionalized antenna system, a radiator comprising a hollow tubular member, an adjustable loading coil connected to one end of said radiator, a driving shaft extending through said hollow member, and means connected to said drive shaft for rotating said loading coil to adjust said loading coil from the other end of said hollow member.

33. In a sectionalized antenna system, a radiator comprising a hollow tubular member, an adjustable loading coil connected to one end of said radiator, a driving shaft extending through said hollow member, and means connected to said drive shaft for rotating said loading coil to adjust said loading coil from the other end of said hollow member, said means comprising a motor, and means for pivotally mounting said antenna system including said motor for permitting said entire structure to be rocked in the event it is engaged by an obstruction.

34. In a sectionalized antenna system, a radiator comprising a hollow tubular member, an adjustable loading coil connected to one end of said radiator, a driving shaft extending through said hollow member, and means connected to said drive shaft for rotating said loading coil to adjust said loading coil from the other end of said hollow member, said means comprising an electrical motor, and manually adjustable means for predetermining the rotation of said motor.

35. In a sectionalized antenna system, a radiator comprising a hollow tubular member, an adjustable loading coil, a brush in contact with the conductor of said loading coil and connected to said tubular member, a drive shaft extending through said hollow tubular member for rotating said coil to insert variable amounts thereof in electrical circuit with said radiator, and means for automatically driving said shaft a predetermined amount for predetermined tuning of said antenna.

36. In a sectionalized antenna system, a radiator comprising a hollow tubular member, an adjustable loading coil, a brush in contact with the conductor of said loading coil and connected to said tubular member, a drive shaft extending through said hollow tubular member for rotating said coil to insert variable amounts thereof in electrical circuit with said radiator, means for automatically driving said shaft a predetermined amount for predetermined tuning of said antenna, and means for moving said brush axially along said loading coil as said loading coil is rotated.

37. In a sectionalized antenna system, a radiator comprising a hollow tubular member, an adjustable loading coil connected to one end of said radiator, a driving shaft extending through said hollow member, and means connected to said drive shaft for rotating said loading coil to adjust said loading coil from the other end of said hollow member, said antenna and drive shaft being at the same electric potential.

EDWARD J. HEFELE.